US010902652B2

United States Patent
Kwak et al.

(10) Patent No.: US 10,902,652 B2
(45) Date of Patent: Jan. 26, 2021

(54) METHOD AND PROGRAM FOR REDUCING ARTIFACTS BY STRUCTURAL SIMILARITY, AND MEDIAL IMAGING DEVICE

(71) Applicants: THE ASAN FOUNDATION, Seoul (KR); UNIVERSITY OF ULSAN FOUNDATION FOR INDUSTRY COOPERATION, Ulsan (KR); KOREA ADVANCED INSTITUTE OF SCIENCE AND TECHNOLOGY, Daejeon (KR)

(72) Inventors: Jung Won Kwak, Namyangju-si (KR); Sang Wook Lee, Seoul (KR); Byung Chul Cho, Anyang-si (KR); Chung Hwan Lee, Seoul (KR); Seungryong Cho, Daejeon (KR); Changhwan Kim, Daejeon (KR)

(73) Assignees: THE ASAN FOUNDATION, Seoul (KR); UNIVERSITY OF ULSAN FOUNDATION FOR INDUSTRY COOPERATION, Ulsan (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 85 days.

(21) Appl. No.: 16/048,996

(22) Filed: Jul. 30, 2018

(65) Prior Publication Data
US 2019/0043225 A1 Feb. 7, 2019

(30) Foreign Application Priority Data
Aug. 2, 2017 (KR) .................. 10-2017-0097972

(51) Int. Cl.
G06T 11/00 (2006.01)
G06T 7/00 (2017.01)
G06T 5/00 (2006.01)

(52) U.S. Cl.
CPC .............. *G06T 11/008* (2013.01); *G06T 7/97* (2017.01); *G06T 5/005* (2013.01); *G06T 2207/10072* (2013.01); *G06T 2211/424* (2013.01)

(58) Field of Classification Search
None
See application file for complete search history.

(56) References Cited

U.S. PATENT DOCUMENTS

2019/0026895 A1* 1/2019 Sarkar .................. G06T 7/0014

OTHER PUBLICATIONS

Kim et al.; Metal Artifact Reduction with an Additional Tilted CT Scan: A Preliminary Study; AAPM 2017 via web site on Jun. 1, 2017.

(Continued)

*Primary Examiner* — Dov Popovici
(74) *Attorney, Agent, or Firm* — Studebaker & Brackett PC

(57) ABSTRACT

A method of reducing an artifact by using structural similarity. The method includes at least: obtaining a plurality of input Computed Tomography (CT) images including a first CT image and a second CT image, generating an artifact map in which anatomical information is removed and artifacts information is remained, by subtracting the second. CT image from the first CT image, generating, by the computer, a structural similarity map between each CT image and the artifact map, and generating, by the computer, a final reconstructed image by comparing particular parts on images of a plurality of structural similarity maps with each other and selecting data of an input CT image which has been used to generate a particular part of a structural similarity map (Continued)

having a lowest degree of structural similarity, as data of a particular part on the final reconstructed image.

3 Claims, 6 Drawing Sheets

(56) References Cited

OTHER PUBLICATIONS

Kim et al.; Metal Artifact Reduction with an Additional Tilted CT Scan: A Preliminary Study; AAPM 2017 presentation on Aug. 1, 2017.

* cited by examiner

METHOD AND PROGRAM FOR REDUCING ARTIFACTS BY STRUCTURAL SIMILARITY, AND MEDIAL IMAGING DEVICE

CROSS-REFERENCE TO RELATED APPLICATIONS

A claim for priority under 35 U.S.C. § 119 is made to Korean Patent Application No. 10-2017-0097972 filed Aug. 2, 2017, in the Korean Intellectual Property Office, the entire content of which is hereby incorporated by reference.

BACKGROUND

Embodiments of the inventive concept described herein relate to a method of reducing artifacts by using structural similarity and a program thereof, and more particularly, relate to a method and a program of improving the image quality of an area, which is difficult to be checked due to artifacts, by reducing the artifacts generated in a medical image.

In the process of taking a computerized tomography (CT) image, artifacts (image defects resulting from improper image sampling) are generated due to various factors. The readability of a CT image may be seriously degraded by an object having a high density in a subject. An object, which has a significantly higher density than the surrounding body tissue, has a relatively high attenuation coefficient, so that beam hardening, beam scattering, starburst, and streak artifact phenomena may occur in the entire region as well as a peripheral region of the CT image of the object. That is, artifacts are generated in the CT image due to noise, beam hardening, scatter, metal inside the body, motion of the body, and the like.

Specifically, a metal implant in a subject hardly transmits X-rays so that the metal implant may cause a metal artifact, such as a streak artifact, a cupping artifact, a star artifact, and the like, in the peripheral region. Such a metal artifact is generated on a reconstructed image and not only degrades the image quality but also causes an error in terms of a radiation treatment plan. Such an error reduces the accuracy and therapeutic effectiveness of radiotherapy.

Conventionally, various schemes have been applied to remove artifacts in a CT image. There have been made attempts to remove artifacts by using a sinogram inpainting scheme or an iterative reconstruction scheme. In particular, in the case of an oral cavity, since a damaged tooth is treated with the prosthesis of a high-density material such as a metal, there is a need to provide an effective metal artifact reduction (MAR) scheme to obtain a readable CT image.

SUMMARY

Embodiments of the inventive concept provide a method and a program for reducing artifacts by using structural similarity, which are capable of generating an artifact map by using a plurality of CT images and a final image from which artifacts are removed by using the structural similarity between the CT images and the artifact map, thereby making it possible to visually diagnose a tissue of a region in which an artifact exists.

Objects of the inventive concept may not be limited to the above, and other objects will be clearly understandable to those having ordinary skill in the art from the following disclosures.

According to an aspect of an embodiment, a method of reducing an artifact by using structural similarity includes obtaining a plurality of input CT images by a computer, generating an artifact map by comparing the plurality of input CT images with each other by the computer, generating a structural similarity map between each CT image and the artifact map by the computer, and generating, by the computer, a final reconstructed image by comparing specific points on a plurality of structural similarity maps with each other and applying data of an input CT image used to generate a structural similarity map having a lowest degree of structural similarity as data of a specific point.

The plurality of input CT images may include a first CT image and a second CT image, where the second CT image may be an image reproduced in a vertical section after being taken at a section sloped by a specific angle.

The plurality of input CT images may include a first CT image and a second CT image, where the second CT image may be an image obtained by reconstructing the first CT image in a sinogram inpainting scheme.

The generating of the final reconstructed image may include determining, by the computer, a structural similarity map having a low degree of structural similarity at each point on a two-dimensional plane among the plurality of structural similarity maps, acquiring, by the computer, data in an input CT image with which a structural similarity map having a minimum degree of structural similarity at each point is generated, and combining, by the computer, image data of all points on the two-dimensional plane to generate the final reconstructed image.

According to another embodiment, a program for reducing an artifact by using structural similarity is stored in a medium and is coupled to hardware to execute a method of reducing artifacts by using structural similarity.

According to the embodiments described above, there are provided various effects as follows.

First, a clearly reconstructed CT image may be provided such that a medical staff may confirm whether an abnormal tissue exists in a region in which an artifact occurs. In other words, the error of a radiotherapy plan may be reduced by improving the quality and accuracy of the image, thereby consequently improving the accuracy and therapeutic effect of radiotherapy.

Second, since there is provided an independent artifact reduction scheme which is different from a sinogram inpainting scheme and an iterative image reconstruction scheme according to the related art, the artifact reduction effect may be more improved by using the embodiments together with the conventional schemes.

BRIEF DESCRIPTION OF THE FIGURES

The above and other objects and features will become apparent from the following description with reference to the following figures, wherein like reference numerals refer to like parts throughout the various figures unless otherwise specified, and wherein.

Figure 5:
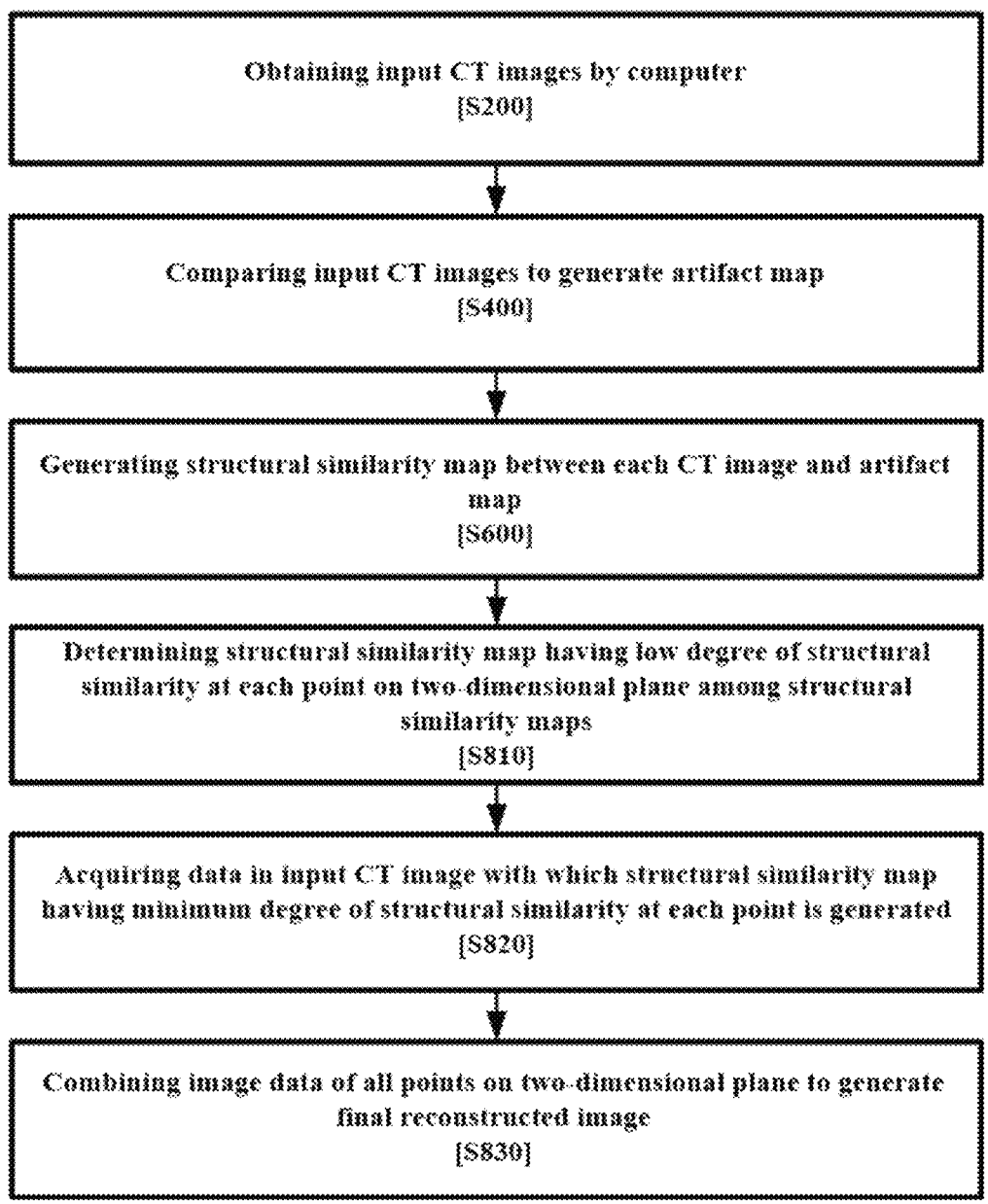
Figure 6:
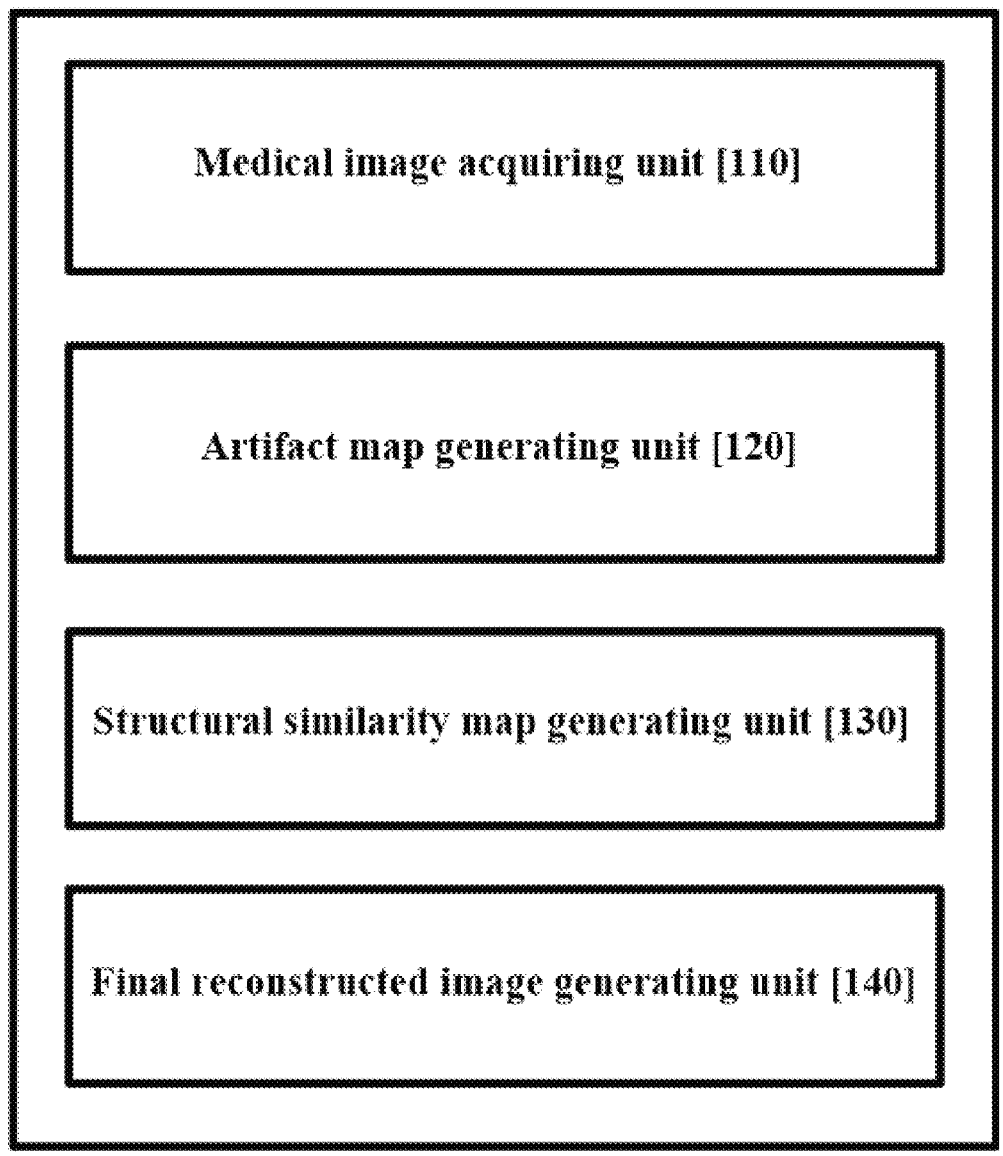

4 is a view illustrating an example of a final reconstructed image in which artifacts are reduced according to an embodiment;

FIG. 5 is a flowchart illustrating a method of reducing artifacts by using structural similarity by which a final reconstructed image is generated by extracting image data from a CT image having the minimum structural similarity to an artifact map, according to an embodiment; and FIG. 6 is a view illustrating an internal configuration of a medical image acquiring apparatus which reduces the artifacts in a metical image by using structural similarity according to an embodiment.

DETAILED DESCRIPTION

Hereinafter embodiments of the inventive concept will be described in detail with reference to the accompanying drawings. Advantages and features of embodiments of the inventive concept, and a method for achieving them will be apparent with reference to the accompanying drawings and detailed description that follows. But, it should be understood that the inventive concept is not limited to the following embodiments and may be embodied in different ways, and that the embodiments are given to provide complete disclosure of the inventive concept and to provide thorough understanding of the inventive concept to those skilled in the art, and the scope of the inventive concept is limited only by the accompanying claims and equivalents thereof. Like reference numerals refer to like elements throughout the specification.

Unless otherwise defined, all terms used herein (including technical or scientific terms) have the same meanings as those generally understood by those skilled in the art to which the inventive concept pertains. Such terms as those defined in a generally used dictionary are not to be interpreted as having ideal or excessively formal meanings unless defined clearly and specifically.

The terms used in the present disclosure are provided to describe embodiments, not intended to limit the inventive concept. In the present disclosure, singular forms are intended to include plural forms unless the context clearly indicates otherwise. It will be further understood that the terms "comprises," and/or "comprising," used herein, specify the presence of stated elements, but do not preclude the presence or addition of one or more other elements.

In the present disclosure, the artifact includes all image defects occurring in a CT image. That is, the artifact includes an artifact (e.g., a metal artifact) generated by a high-density object inside a body, an artifact (i.e., a motion artifact) generated by a body movement such as respiration, and the like.

In the present disclosure, a computer includes various devices capable of performing operations. For example, the computer may be a smart phone, a tablet PC, a cellular phone, a personal communication service (PCS) phone, a mobile terminal for synchronous/asynchronous International Mobile Telecommunication-2000 (IMT-2000), a Palm Personal Computer (PC), a personal digital assistant (PDA), or the like as well as a desk-top PC and a notebook PC. In addition, the computer may be a server computer that receives information from a client. Further, the computer may be a medical imaging device that obtains a medical image (e.g., a CT image).

In the present disclosure, an artifact map refers to an image representing an artifact included in a medical image (particularly, a CT image) except for anatomical information.

Hereinafter, a method and a program for reducing artifacts by using structural similarity according to an embodiment of the present disclosure will be described in detail with reference to accompanying drawings.

Figure 1:
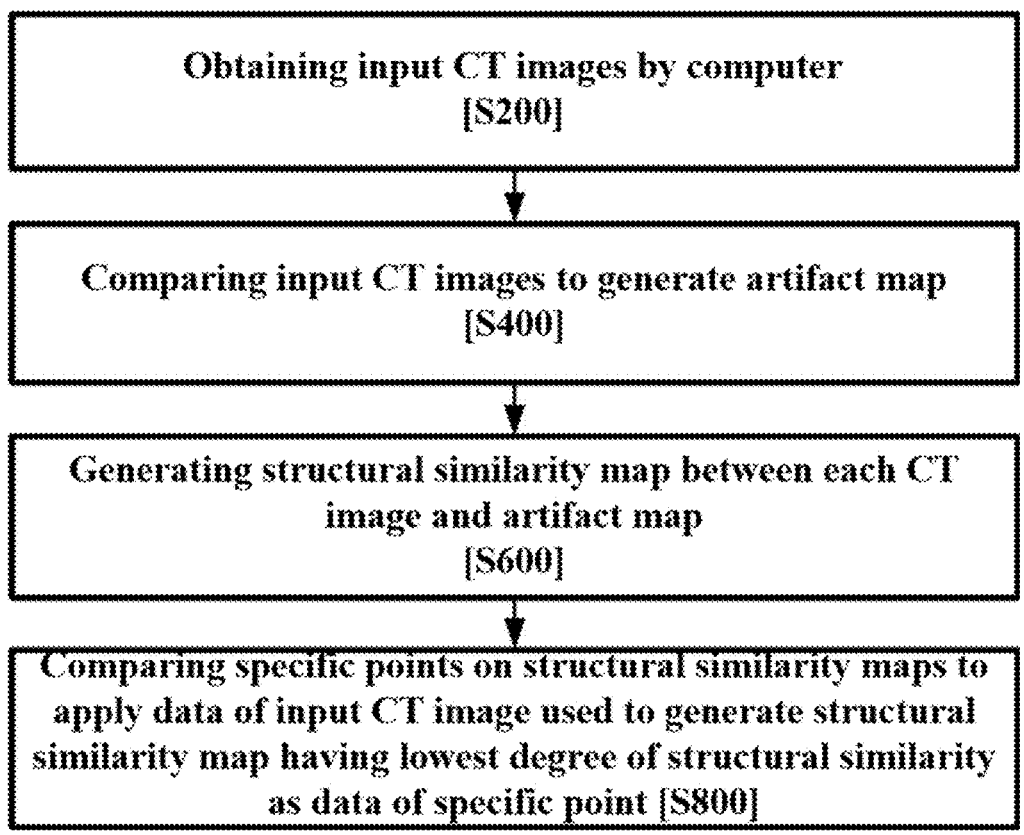
FIG. 1 is a flowchart illustrating a method of reducing artifacts by using structural similarity according to an embodiment.

FIG. 1 is a flowchart illustrating a method of reducing artifacts by using structural similarity according to an embodiment.

Figure 2:
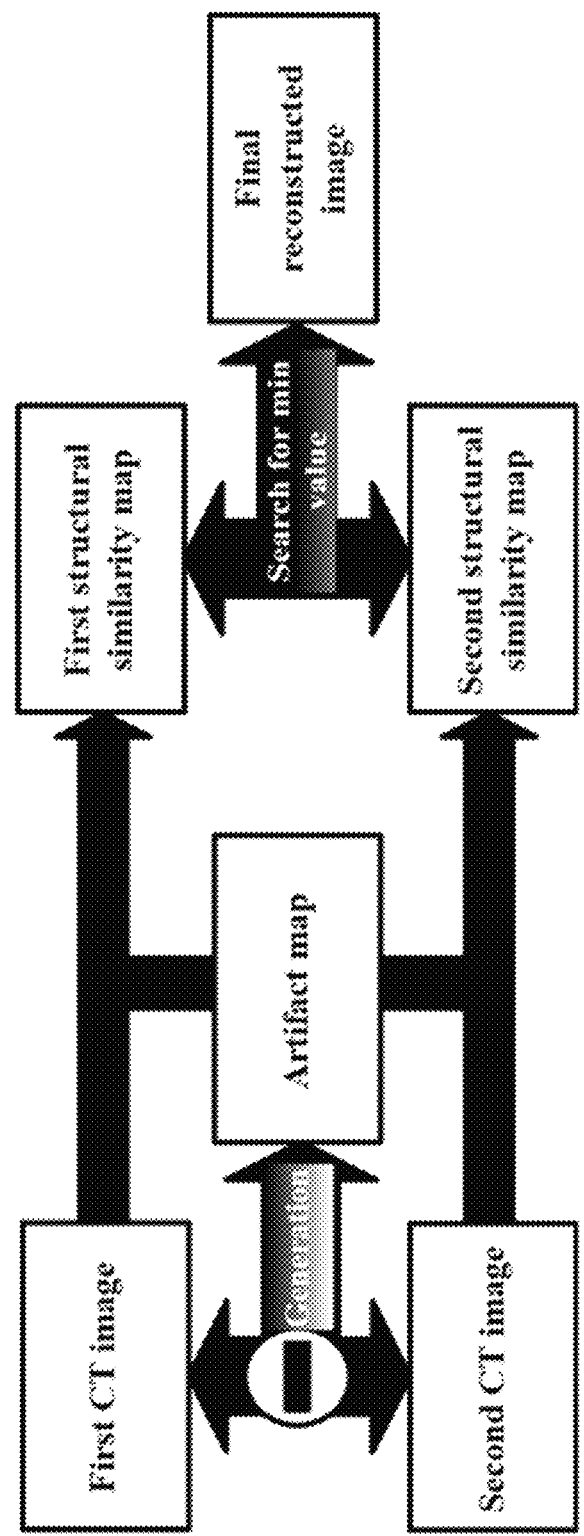
FIGS. 2 and 3 are views illustrating an image processing process according to a method of reducing artifacts by using structural similarity according to an embodiment.
Figure 3:
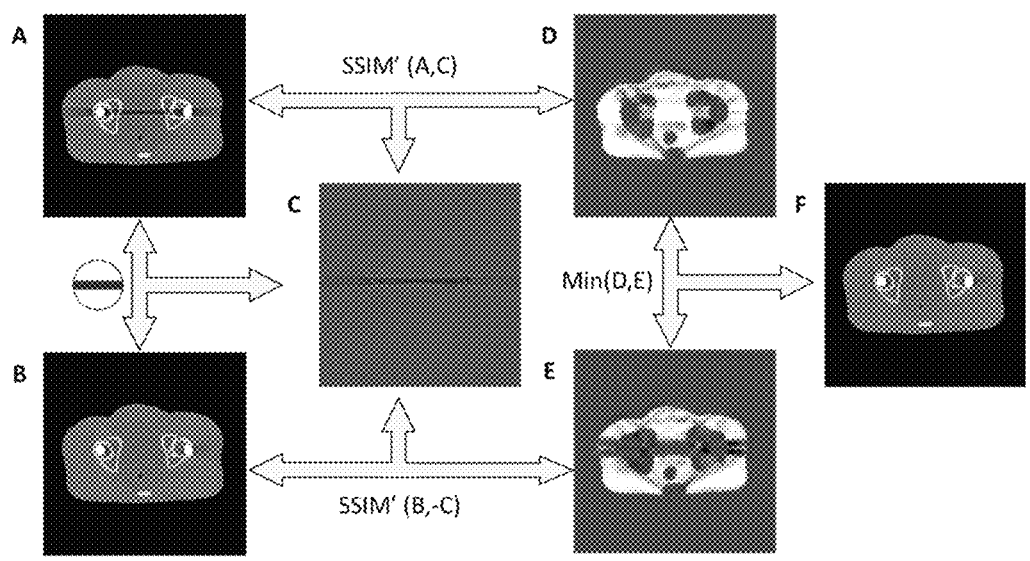

FIGS. 2 and 3 are views illustrating an image processing process according to a method of reducing artifacts by using structural similarity according to an embodiment.

Referring to FIGS. 1 to 3, a method of reducing artifacts by using structural similarity according to an embodiment includes an operation S200 of obtaining a plurality of input CT images by a computer, an operation S400 of generating an artifact map by comparing the plurality of input CT images with each other by the computer, an operation S600 of generating a structural similarity map between each CT image and the artifact map by the computer, and an operation S800 of comparing a specific point on a plurality of structural similarity maps with each other and applying data of an input CT image used to generate a structural similarity map having a lowest degree of structural similarity as data of a specific point by the computer. Hereinafter, each operation will be described in detail.

In operation S200, the computer obtains the plurality of CT images. That is, the computer obtains first and second CT images. According to an embodiment, the first CT image is an image ("A" of FIG. 3) obtained in a general scanning scheme (i.e., a scheme of taking a tomogram of a body part in a vertical section), and the second CT image is an image ("B" of FIG. 3) which is reproduced as a vertical section after scanning a section inclined by a specific angle rather than the vertical section. That is, when the direction in which the radiation is applied to the body is changed, as image B of FIG. 3, the shape and generation direction of an artifact are changed. Thus, the computer obtains a tomogram inclined by a specific angle, and generates a vertical tomogram of a body after generating a three-dimensional image based on the obtained tomogram.

Figure 4:
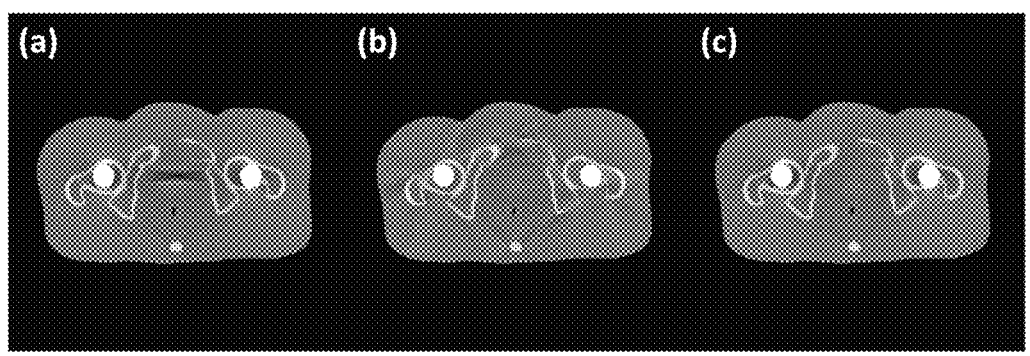
FIG. 4 is a view illustrating examples of CT images. (a) of FIG. 4 is a view illustrating an example of a CT image in which an artifact is generated, (b) of FIG. 4 is a view illustrating an example of a CT image from which an artifact is removed in a sinogram inpainting scheme, and (c) of FIG.

In addition, according to another embodiment, the first CT image may be an image obtained by a general scanning scheme (i.e., a scheme of taking a tomogram of a body part in a vertical section) as shown in (a) of FIG. 4), and the second CT image may be an image obtained by reconstructing the first CT image in a conventional artifact reducing scheme (e.g., an image obtained by reconstructing the first CT image in a sinogram inpainting scheme, that is, (b) of FIG. 4). Thus, the computer may compare an original CT image with a CT image in which the artifacts are primarily removed in another artifact reducing scheme and may accurately detect the artifacts included in the original CT image (the first CT image) as described below.

A combination of the first and second CT images is not limited to the examples described above, but may include various comparable CT image combinations for generating an artifact map to be described below. In addition, the computer may acquire three or more CT images to improve the accuracy of artifact map generation.

Then, in operation S400, the computer compares the CT images with each other to generate the artifact map. According to an embodiment, when two CT images (i.e., the first and second CT images) are used to generate the artifact map, the computer subtracts the second CT image from the first CT image to generate the artifact map. As shown in FIG. 3, the first CT image (i.e., the CT image taken in the vertical sectional direction) has artifacts (i.e., metal artifacts) generated in a large region thereof due to metal inside a body, whereas the second CT image is taken while it is rotated by a specific angle (e.g., 10 degrees) so that the second CT image has less artifacts than the first CT image. Therefore, the computer subtracts the second CT image from the first CT image corresponding to the same section to generate the artifact map in which only the artifacts included in both CT images remain. That is, the computer subtracts the second CT image from the first CT image, such that the computer generates the artifact map in which the anatomical information is removed and only the artifacts remain.

In operation S600, the computer generates the structural similarity map between each CT image and the artifact map. According to an embodiment, when the artifact map is generated by using the first and second CT images, the computer generates the structural similarity map by calculating the structural similarity between each point in the first CT image and the same point on the artifact map, and generates the structural similarity map by calculating the structural similarity between each point in the second CT image and the same point on the artifact map. That is, the computer searches for the parts of the CT image that are structurally similar to the artifact map.

According to an embodiment, to calculate the structural similarity between the CT image and the artifact map, the computer uses a modified structural similarity (SSIM) index expressed as following equation 1.

$$SSIM(x, y) = c(x, y) \cdot s(x, y), \text{ where} \quad [\text{Equation 1}]$$
$$c(x, y) = \frac{2\sigma_x \sigma_y + C_2}{\sigma_x^2 + \sigma_y^2 + C_2}$$
$$s(x, y) = \frac{\sigma_{xy} + C_3}{\sigma_x \sigma_y + C_3}$$

The computer takes into consideration only the similarity of the contrast and structure without considering luminance similarity between an input CT image and an artifact map. In detail, the computer generates the structural similarity map in consideration of c(x, y) of comparing the contrast of sample 'x' with the contrast of sample 'y' and s(x, y) of comparing the structure factor of sample 'x' with the structure factor of sample 'y'. Thus, the computer obtains a first structural similarity map by comparing the first CT image with the artifact map, and a second structural similarity map by comparing the second CT image and the artifact map.

In operation S800, the computer compares the specific points on a plurality of structural similarity maps with each other to apply data of an input CT image used to generate a structural similarity map having a lowest degree of structural similarity as data of a specific point. When the structural similarity of a specific point in the CT image to the artifact map is high, the corresponding point has an artifact. When the structural similarity of the specific point in the CT image to the artifact map is low, the corresponding point is substantially free from artifacts.

Therefore, as illustrated in FIG. 5, in operation S810, the computer determines a structural similarity map having a low degree of structural similarity at each point on a two-dimensional plane among the plurality of structural similarity maps. Then, in operation S820, the computer acquires data in the input CT image with which a structural similarity map having a minimum degree of structural similarity at each point is generated. That is, the computer extracts image data of point 'A' from the first CT image, which is the input CT image used to generate a first structural similarity map when the first structural similarity map has the minimum value at point 'A' on the two-dimensional plane. Then, in operation S830, the computer combines image data of all points on the two-dimensional plane to generate a final reconstructed image. Thus, the computer acquires the final reconstructed image ((c) of FIG. 4) from which artifacts are removed.

A medical image acquisition apparatus 100 according to another embodiment of the present disclosure performs a method of reducing artifacts by using structural similarity according to an embodiment. To this end, as illustrated in FIG. 6, the medical image acquisition apparatus 100 according to another embodiment includes a medical image acquiring unit 110, an artifact map generating unit 120, a structural similarity map generating unit 130, and a final reconstructed image generating unit 140.

The medical image acquiring unit 110 is a device for acquiring a medical image by scanning the body of a patient. The medical image acquiring unit 110 may correspond to a CT image acquiring unit that acquires a medical image using radiation. The CT image acquiring unit may acquire a plurality of CT images through a plurality of scans.

The artifact map generating unit 120 compares a plurality of medical images (i.e., a combination of medical images taken under different conditions or an original medical image and an artifact-corrected medical image of the original medical image with conventional schemes) to generate the artifact map from which body tissues are removed to maintain only artifacts. For example, the artifact map generating unit 120 generates the artifact map by subtracting the second medical image from the first medical image.

The structural similarity map generating unit 130 generates the structural similarity map by comparing the input medical image (i.e., the first or second medical image) with the artifact map. The detailed description of the scheme of generating the structural similarity map described above will be omitted.

The final reconstructed image generating unit 140 compares the specific points on a plurality of structural similarity maps with each other to apply data of an input medical image used to generate a structural similarity map having the lowest degree of structural similarity as data of a specific point. The detailed description of the scheme of generating the final reconstructed image described above will be omitted.

The method of reducing artifacts by using structural similarity according to an embodiment of the present disclosure described above may be implemented as a program (or an application) which is executed while being combined with a computer as hardware, where the program is stored in a medium.

To execute the methods implemented as computer readable programs, the above-mentioned programs may include codes which are coded with computer languages such as C, C++, JAVA, machine language, and the like which may be read by a processor (CPU) of the computer through the device interface of the computer. The code may include a functional code associated with a function of defining functions required to perform the methods, and may also include an execution procedure related control code required to allow the processor of the computer to execute the functions according to a predetermined procedure. In addition, the code may further include a memory reference related code as to which location (address) of the internal or external memory of the computer should be referenced for additional information or media required to allow the processor of the computer to perform the functions. Further, to allow the processor of the computer to perform the functions, when the processor needs to communicate with any other computers or servers, and the like located at a remote place, the code may further include a communication-related code about how the processor of the computer communicates with any other computers or servers located at a remote place or what information or media the processor of the computer transmits and receives at the time of the communication, by using the communication module of the computer.

The recording medium is not a medium for storing data for a short time such as a register, a cache, a memory, and the like, but means a medium which semi-permanently stores data and is readable through a device. In detail, as examples, the recording medium includes a ROM, a RAM, a CD-ROM, a magnetic tape, a floppy disk, an optical media storage device, but the embodiments are not limited thereto. That is, the program may be stored in various recording media on various servers to which a computer is accessible or in various recording media on a user's computer. Further, the medium may store codes which are distributed to a computer system connected through a network and readable by a computer in a distribution manner.

According to the embodiments described above, a clearly reconstructed CT image may be provided such that a medical staff may confirm whether an abnormal tissue exists in a region in which an artifact occurs. In other words, the error of a radiotherapy plan may be reduced by improving the quality and accuracy of the image, thereby consequently improving the accuracy and therapeutic effect of radiotherapy.

In addition, since there is provided an independent artifact reduction scheme which is different from a sinogram inpainting scheme and an iterative image reconstruction scheme according to the related art, the artifact reduction effect may be more improved by using the embodiments together with the conventional schemes.

While the inventive concept has been described with reference to embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A method of reducing an artifact by using structural similarity, the method comprising:
    obtaining, by a computer, a plurality of input Computed Tomography CT images including a first CT image and a second CT image, wherein
        the first CT image is an image being taken in a vertical sectional direction,
        the second CT image is an image reproduced in a vertical section after being taken at a section sloped by a specific angle, and
        a shape of artifacts within the second CT image is different than a shape of artifacts within the first CT image;
    generating, by the computer, an artifact map in which anatomical information is removed and artifacts information is remained, by subtracting the second CT image from the first CT image;
    generating, by the computer, a structural similarity map between each CT image and the artifact map by calculating a structural similarity between each point in the each CT image and a corresponding point on the artifact map; and
    generating, by the computer, a final reconstructed image by comparing particular parts on images of a plurality of structural similarity maps with each other and selecting data of an input CT image, which has been used to generate the particular part, of the structural similarity map having a lowest degree of the structural similarity, as data of the particular part, which corresponds to the particular part, on the final reconstructed image.

2. The method of claim 1, wherein the generating of the final reconstructed image includes:
    determining, by the computer, the structural similarity map having the lowest degree of the structural similarity, at each part of a two-dimensional plane among the plurality of structural similarity maps;
    acquiring, by the computer, the data of the input CT image, which has been used to generate the structural similarity map having the lowest degree of the structural similarity; and
    combining, by the computer, image data of each part of the two-dimensional plane to generate the final reconstructed image, based on the acquired data of the input CT image.

3. A non-transitory computer-readable recording medium storing a program, and configured to be coupled to the computer being hardware, the program includes instructions to execute the method of claim 1.

* * * * *